United States Patent
Uebelacker

(10) Patent No.: US 8,820,829 B2
(45) Date of Patent: Sep. 2, 2014

(54) VEHICLE SEAT AND METHOD OF PRODUCING AN UPHOLSTERED VEHICLE SEAT PART

(75) Inventor: Roland Uebelacker, Pfreimd (DE)

(73) Assignee: Grammer AG, Amberg (DE)

( * ) Notice: Subject to any disclaimer, the term of this patent is extended or adjusted under 35 U.S.C. 154(b) by 52 days.

(21) Appl. No.: 13/453,896

(22) Filed: Apr. 23, 2012

(65) Prior Publication Data

US 2012/0274118 A1 Nov. 1, 2012

(30) Foreign Application Priority Data

Apr. 28, 2011 (DE) .......................... 10 2011 019000

(51) Int. Cl.
*A47C 7/74* (2006.01)

(52) U.S. Cl.
USPC ............ 297/180.14; 297/180.13; 297/452.42; 297/452.46; 297/452.47

(58) Field of Classification Search
USPC ............. 297/180.13, 180.14, 452.42, 452.46, 297/452.47
See application file for complete search history.

(56) References Cited

U.S. PATENT DOCUMENTS

| | | | | |
|---|---|---|---|---|
| 6,857,697 | B2 * | 2/2005 | Brennan et al. | 297/180.13 |
| 6,869,139 | B2 * | 3/2005 | Brennan et al. | 297/180.13 X |
| 7,478,869 | B2 * | 1/2009 | Lazanja et al. | 297/180.14 |
| 7,735,932 | B2 * | 6/2010 | Lazanja et al. | 297/180.14 X |
| 7,775,602 | B2 * | 8/2010 | Lazanja et al. | 297/180.14 X |
| 7,971,931 | B2 * | 7/2011 | Lazanja et al. | 297/180.14 |
| 8,162,391 | B2 * | 4/2012 | Lazanja et al. | 297/180.14 |
| 8,360,517 | B2 * | 1/2013 | Lazanja et al. | 297/180.14 |
| 2005/0093347 | A1 * | 5/2005 | Bajic et al. | 297/180.13 |
| 2008/0217967 | A1 * | 9/2008 | Bajic et al. | 297/180.13 |
| 2009/0152908 | A1 * | 6/2009 | Lazanja et al. | 297/180.14 X |
| 2010/0176627 | A1 * | 7/2010 | Lazanja et al. | 297/180.14 X |

* cited by examiner

*Primary Examiner* — Rodney B White
(74) *Attorney, Agent, or Firm* — Lowe Graham Jones PLLC

(57) ABSTRACT

A vehicle seat with a seat part, with a seat back and with at least one air-permeable upholstered part having at least a main upholstery, a barrier coat and an upholstery cover. The barrier coat is disposed between the main upholstery and the upholstery cover or a carrier layer thereof. The upholstered part has an additional air-permeable upholstery core that is different from the main upholstery. The air-permeable upholstery core in the region adjoining the main upholstery may be ventilated.

10 Claims, 2 Drawing Sheets

VEHICLE SEAT AND METHOD OF PRODUCING AN UPHOLSTERED VEHICLE SEAT PART

PRIORITY CLAIM

This application claims the benefit of German Application Serial No. 102011019000.7 filed on Apr. 28, 2011, contents of which are incorporated herein.

FIELD OF THE INVENTION

The invention relates on the one hand to a vehicle seat with a seat part, with a seat back and with at least one air-permeable upholstered part having at least a main upholstery, a barrier coat and an upholstery cover, wherein the barrier coat is disposed between the main upholstery and the upholstery cover or a carrier layer thereof.

The invention relates on the other hand to a method of producing an upholstered vehicle seat part, wherein an upholstery cover, a barrier coat and/or a carrier layer for the upholstery cover are connected to one another to form a material blank, and wherein a main upholstery is applied as foam onto the material blank.

BACKGROUND OF THE INVENTION

Generic vehicle seats and methods of producing upholstered vehicle seat parts for use in this connection are well known in many forms from the prior art. In these upholstered vehicle seat parts an upholstery cover and a carrier layer that may also be optionally associated with this upholstery cover are thoroughly and extensively coated with a barrier coat film. In this case the barrier coat film is foam-backed with the actual upholstery of the vehicle seat so that overall a compact upholstered vehicle seat part is provided.

SUMMARY OF THE INVENTION

The present invention facilitates an advantageous adaptation of the degree of firmness on a corresponding upholstered vehicle seat part, in particular in a seat area of a vehicle seat. In addition, the present invention provides a correspondingly simple and cost-effective method of production for the upholstered vehicle seat part.

This is achieved by a vehicle seat with a seat part, with a seat back and with at least one upholstered part comprising at least a main upholstery, and a barrier coat and upholstery cover, wherein the barrier coat is disposed between the main upholstery and the upholstery cover or a carrier layer thereof. The upholstered part of the vehicle seat has an additional air-permeable upholstery core different from the main upholstery and a means for ventilating the air-permeable upholstery core in the region adjoining the main upholstery.

The air-permeable upholstery core and the associated ventilation means extending through the main upholstery to the air-permeable upholstery core provides an excellent adjustment of different degrees of firmness of the upholstered part in a seat area, both on the seat part and on the seat back of the vehicle seat, which can be achieved in a structurally simple and efficient manner.

The term "upholstered part" in the context of the invention describes any means by which the vehicle seat can be upholstered. In this respect the upholstered part can be provided on the seat part and/or on the seat back in order to make the vehicle seat more comfortable for a user.

The term "main upholstery" in the present case covers any means by which the seat part or the seat back can be covered and upholstered extensively by a base upholstery. The main upholstery is usually made from a reaction mixture, for example as a cold foam component.

In order to spatially isolate the upholstery cover from its base, in particular with regard to the main upholstery, it is advantageous if a barrier coat is provided on the upholstery cover.

The present barrier coat may be provided by means of a conventional film, for example a polyurethane film or the like, as is also already customary in the prior art.

A fabric material which is usual for vehicle seats, leather or the like can be used as the upholstery cover.

The upholstery cover is usually backed with a cut foam that in the present case may embody the aforementioned carrier layer to provide advantageous handling. However, it can also be formed by other materials.

The term "air-permeable upholstery core" in the context of the invention describes a further functional area or component of the upholstered part, by which a particularly good adaptation of the degree of firmness is achieved on the upholstered part, both on the seat part and also on the seat back of the vehicle seat.

It is advantageous if the air-permeable upholstery core is integrated in one piece and only partially in the upholstered part so that the air-permeable upholstery core does not underlie the entire seat surface of the vehicle seat. Advantageously, the air-permeable upholstery core can also be provided by an additional foam core having good air permeability characteristics. The air-permeable upholstery core is produced, for example, from a reticulated foam, a separation fabric or the like. In this respect, a preferred variant provides that the air-permeable upholstery core comprises a more open-pored material than the main upholstery.

In the simplest case the air-permeable upholstery core can also be formed by a carrier layer. In this case the carrier layer is thicker than in the surrounding regions in which the upholstery cover is still backed by the carrier layer in the region in which the air-permeable upholstery core is to be provided. Advantageously the structure of the upholstered part can be produced particularly simply in this way.

It has also proved advantageous if the air-permeable upholstery core has a thickness that is more than double, preferably more than three times that of the carrier layer used, since in this way a particularly versatile adaptation of the degree of firmness can be achieved in the region of the air-permeable upholstery core.

Furthermore it is advantageous if the thickness of the air-permeable upholstery core is less than three quarters of and preferably half or less than the height of the main upholstery. Due to a sufficiently high degree of main upholstery in the preferred embodiment, the upholstered part as a whole has a good inherent strength and thus a sufficient resistance and stability of shape under load because the open-pored air-permeable upholstery core is softer than the material of the main upholstery.

The thickness of the air-permeable upholstery core, the thickness of the carrier layer and the height of the main upholstery are measured substantially perpendicular to the upholstery cover.

The stability of the upholstered part can be even further improved if the air-permeable upholstery core is disposed in sections over the surface of the upholstered part. For example, in an alternative embodiment the air-permeable upholstery core can be integrated in many sections into the upholstered part rather than produced as a single structure.

An adaptation of the degree of firmness on the vehicle seat can be further improved if the air-permeable upholstery core immediately adjoins the upholstery cover or a carrier layer of the upholstery cover.

In an alternative embodiment the air-permeable upholstery core is coated, for example, by means of thermal adhesive bonding. In this connection it is advantageous if the barrier coat associated with the upholstery cover is only provided in edge regions of the upholstery cover in the form of longitudinal strips of barrier coat which are spaced apart from one another. The longitudinal strips of barrier coat are preferably applied to the upholstery cover on the left and right, for example, by flame bonding or adhesive bonding. However, they can also advantageously be attached to the upholstery cover by other techniques.

In this respect the longitudinal strips of barrier coat extend in the seat direction on both lateral faces of the seat part and/or on both lateral faces of the seat back, so that the barrier coat is only partially applied to the upholstery cover or the carrier layer thereof.

Preferably no such coating is provided between them. Thus the air-permeable upholstery core can come into direct contact with the upholstery cover or the carrier layer thereof without problems. In this respect a good air circulation from the upholstery cover to a base of a vehicle seat can take place.

In order to be able to prevent a reaction mixture used in the case of foam backing in particular of the air-permeable upholstery core from unintentionally entering pores of the air-permeable upholstery core, it is advantageous if the air-permeable upholstery core is spatially separated from the main upholstery by a layer of barrier coat.

Instead of the barrier coat the air-permeable upholstery core preferably has another layer of barrier coat on the sides facing the main upholstery. Thus it is possible for the air-permeable upholstery core to be applied as an already prefabricated assembly onto the upholstery cover or onto a carrier layer thereof.

The present layer of barrier coat can also be provided by means of a conventional film, such as for example a polyurethane film or the like.

If the barrier coat and the layer of barrier coat consist of an identical material a particularly close connection between them can be ensured. Of course, the layer of barrier coat can also be made from a material that is different from the barrier coat between the main upholstery and the upholstery cover.

Furthermore it is advantageous if the layer of barrier coat in the edge region of the air-permeable upholstery core is connected to the barrier coat. For example the barrier coat and the layer of barrier coat are bonded to one another.

A preferred embodiment provides that the ventilation means comprises at least one ventilation hole that extends below the air-permeable upholstery core through the main upholstery to the air-permeable upholstery core or to a layer of barrier coat of the air-permeable upholstery core. In this way an operationally reliable supply of air with regard to the air-permeable upholstery core can be ensured by a very simple design. In an alternative embodiment, a plurality of ventilation holes is provided to facilitate improved ventilation of the air-permeable upholstery core. If in the region of the ventilation means, in particular in the region of ventilation holes of the ventilation means, a layer of barrier coat of the air-permeable upholstery core has openings, the air flowing through the ventilation holes can also pass through the layer of barrier coat without substantial resistance.

In this respect it is advantageous if a layer of barrier coat, preferably perforated in some regions, is disposed between the upholstery core and the main upholstery.

The openings can be produced by a suitably shaped tool already when a reaction mixture is foamed or only after the foaming, for example, by burning, punching, drilling or cutting.

According to a further feature of the invention, a preferred method of producing an upholstered vehicle seat part is disclosed, wherein an upholstery cover, a barrier coat and/or a carrier layer for the upholstery cover are connected to one another to form a material blank. A main upholstery is applied as foam onto the material blank. The barrier layer is applied as longitudinal edge strips spaced apart from one another in longitudinal edge regions of the upholstery cover or the carrier layer. An air-permeable upholstery core is applied in a central region of the upholstery cover directly onto the upholstery cover or the carrier layer. The air-permeable upholstery core is surrounded by the foam of the main upholstery. At least one ventilation hole is introduced into the main upholstery for ventilation of the upholstery core. In this manner the upholstered part for the vehicle seat can be produced particularly simply and cost-effectively.

An advantageous variant of the method provides that a layer of barrier coat is applied to the air-permeable upholstery core before the upholstery core is applied to the upholstery cover or to the carrier layer or thereafter. Thus penetration of a reaction mixture into the air-permeable upholstery core can be effectively prevented, as described above.

In order to achieve a particularly good exchange of air between the ventilation holes and the air-permeable upholstery core the layer of barrier coat can additionally be pierced at the ventilation holes if the layer of barrier coat as supplied is not sufficiently air-permeable.

In this connection the invention is also achieved by a generic upholstered vehicle seat part wherein the upholstered vehicle seat part has an additional air-permeable upholstery core different from a main upholstery. In this embodiment, the main upholstery includes a device for ventilation of the air-permeable upholstery core in the adjoining region. Preferably the air-permeable upholstery core directly adjoins an upholstery cover or a carrier layer of the upholstery cover and the air-permeable upholstery core is spatially separated from the main upholstery by a layer of barrier coat. In an alternative embodiment, the layer of barrier coat may be pierced at openings of ventilation holes of the ventilation means.

Due to such an advantageous construction in particular the upholstered vehicle seat part can be provided particularly simply in structural and production terms.

The invention provides for the use of a main upholstery of an upholstered vehicle seat part as ventilation means of an air-permeable upholstery core at least partially embedded in the main upholstery, since in order to produce such a ventilation means, by means of which in particular the air-permeable upholstery core is ventilated, only the main upholstery is required. In this embodiment additional components of ventilation means can be omitted.

BRIEF DESCRIPTION OF THE DRAWINGS

Further advantages, aims and characteristics of the present invention are explained with reference to the drawings and the following description, in which a vehicle seat according to the invention and a method for production of an upholstered vehicle seat part for this purpose are illustrated and described by way of example.

Preferred and alternative examples of the present invention are described in detail below with reference to the following drawings.

DETAILED DESCRIPTION OF THE PREFERRED EMBODIMENT

Figure 1:
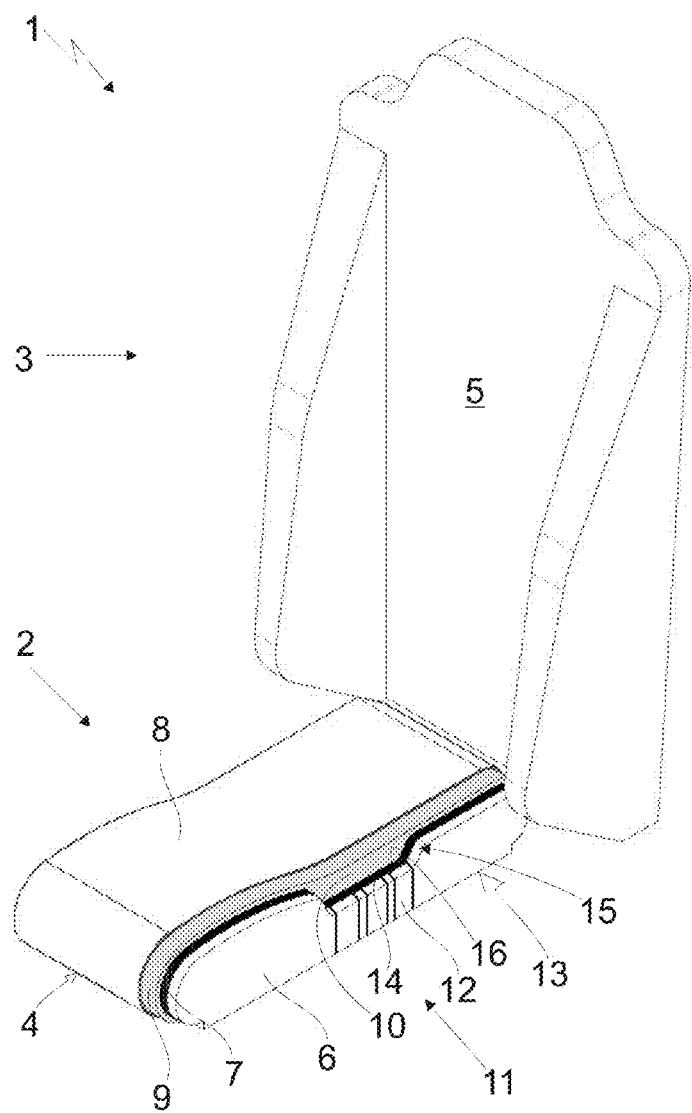
FIG. 1 shows schematically a perspective view of a vehicle seat with an upholstered part comprising an additional air-permeable upholstery core.

The vehicle seat 1 shown in FIG. 1 has a seat part 2 and a seat back 3. Both the seat part 2 and the seat back 3 are each covered by an upholstered part 4 or 5. The construction of the upholstered parts 4 and 5 is explained below using the representative example of the upholstered part 4 of the seat part 2.

The upholstered part 4 comprises a main upholstery 6, a barrier coat 7, an upholstery cover 8 and a carrier layer 9, wherein the barrier coat 7 is disposed between the main upholstery 6 and the carrier layer 9. In this embodiment the upholstery cover 8 is made from a fabric material, the barrier coat 7 from a polyurethane film, the carrier layer 9 from an open-pored cut foam and the main upholstery 6 out from a foamed-on cold foam, wherein the cut foam is more open-pored than the cold foam. Alternative materials may be used.

In one embodiment, an air-permeable upholstery core 10 is preferably integrated into the upholstered part 4 and a means 11 for ventilation of the air-permeable upholstery core 10 is passed through the main upholstery 6.

In a preferred embodiment, the ventilation means 11 consists of a plurality of ventilation holes 12 (only examples being identified by numerals here), which pass from an underside of the seat part 13 substantially perpendicularly through the main upholstery 6 to the air-permeable upholstery core 10. In this respect the ventilation means 11 is provided, at least in the region of the main upholstery 6, directly by the material of the main upholstery 6.

In order that a spatial connection between the individual ventilation holes 12 of the ventilation means 11 and the air-permeable upholstery core 10 can be guaranteed to be particularly permeable, openings 14 (only examples being identified by numerals here) into the barrier coat 7 are introduced in each case above the individual ventilation holes 12. In this embodiment the air-permeable upholstery core 10 is formed directly by a thicker region 15 of the carrier layer 9, which also directly adjoins the upholstery cover 8.

In one embodiment, the air-permeable upholstery core 10 is separated from the main upholstery 6 by a layer of barrier coat 16 that is preferably formed by the barrier coat 7. Due to the spatial separation it is possible during foaming of the main upholstery 6 to prevent a corresponding reaction mixture from penetrating into pores (not explicitly shown here) of the air-permeable upholstery core 10 and rendering the latter unusable for absorption of air or thereby disadvantageously reducing the ability to absorb air.

Figure 2:
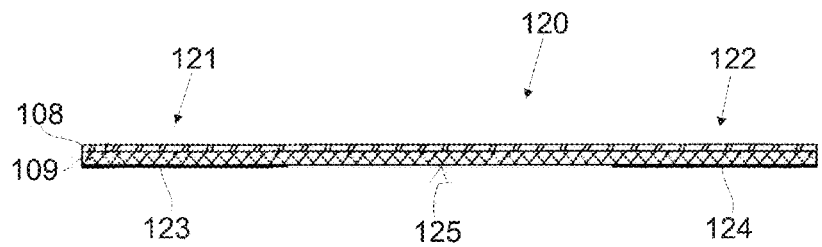
FIGS. 2 to 4 show schematically a first preferred method sequence for producing an upholstered vehicle seat part.
Figure 3:
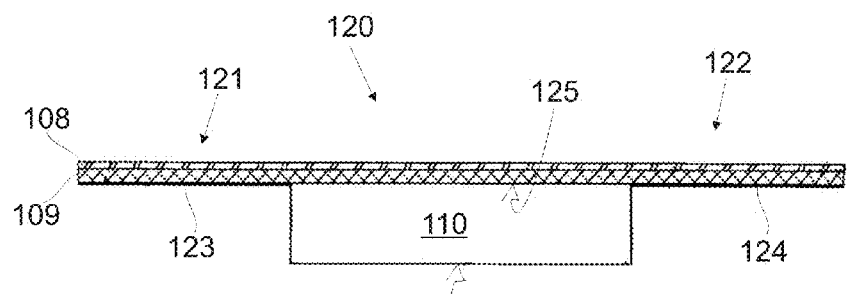
Figure 4:
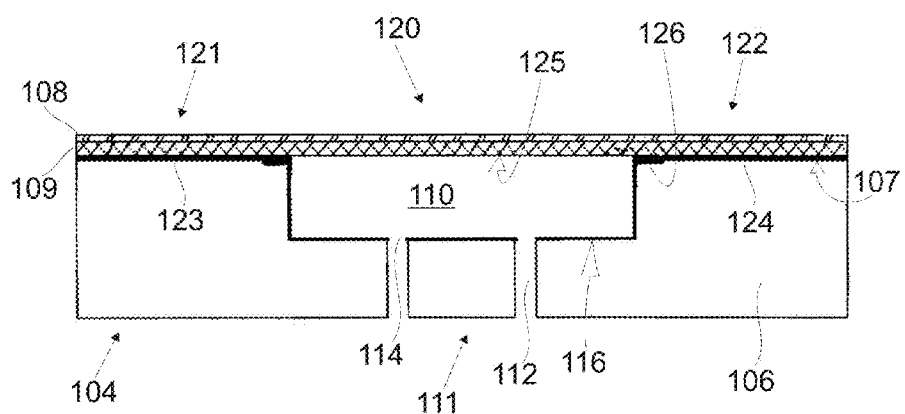

In the method sequence shown in FIGS. 2 to 4, in a first step a carrier layer 109 made from a cut foam is applied to an upholstery cover 108 made from a fabric material.

As illustrated with reference to FIG. 2, on the material blank 120 thus formed a barrier coat 107 consisting of longitudinal edge strips 123 and 124 spaced apart from one another is then applied in each case in edge regions on the left 121 and the right 122 onto the carrier layer 109. Thus the barrier coat 107 covers the carrier layer 109 only partially and not completely, as is hitherto usual in the prior art in generic upholstered parts for vehicle seats.

Between these two longitudinal edge strips 123 and 124 spaced apart from one another there remains an uncoated central region 125, onto which in a further step illustrated with reference to FIG. 3 an air-permeable upholstery core 110 is directly applied.

Before the application onto the carrier layer 109 the air-permeable upholstery core 110 is already provided with a layer of barrier coat 116 which in an adjacent edge region 126 of the air-permeable upholstery core 110 is adhered in each case to the longitudinal edge strips 123 or 124 of the barrier coat 107. Accordingly, the layer of barrier coat 116 is located substantially only on regions of the air-permeable upholstery core 110 which do not come into direct operational contact with the carrier layer 109. Both the barrier coat 107 and the layer of barrier coat 116 consist in this embodiment of a polyurethane film.

The air-permeable upholstery core 110 is advantageously shielded by the layer of barrier coat 116, in particular relative to a reaction mixture for foaming of a main upholstery 106, which in a further step illustrated in FIG. 4 is correspondingly foamed onto the layer of barrier coat 116 or onto the longitudinal edge strips 123 and 124 of the barrier coat 107.

For this purpose the construction according to FIG. 3 is placed into a foam-backing tool (not shown) and a corresponding cavity is filled with the reaction mixture. In this case it is advantageous if the central region 125 on the upholstery cover side is supported by a bearing surface of the foam-backing tool so that the air-permeable upholstery core 110 is retained in position during foam backing. In this embodiment, corresponding support pins can be provided, for example on a closure cover of the foam-backing tool.

In order that a sufficiently large amount of process air can be supplied to the air-permeable upholstery core 110, the main upholstery 106 is preferably provided with ventilation holes 112 and the layer of barrier coat 116 is provided with openings 114 at the ventilation holes 112. Either the ventilation holes 112 are introduced into the main upholstery 106 directly during foaming using an appropriate configuration of the foam-backing tool, or they are subsequently drilled into the main upholstery 106. In this case the ventilation holes 112 constitute a ventilation means 111 for the air-permeable upholstery core 110.

The openings 114 are then pierced through the ventilation holes 112 by a piercing tool into the layer of barrier coat 116, wherein other techniques can also be used in order to produce the openings 114 advantageously.

The above-described method ensures good air circulation through the main upholstery 106 from the upholstery cover 108 to the base of a vehicle seat (not shown here).

In one embodiment, the main upholstery 106 is made from a harder and denser material than the air-permeable upholstery core 110. In this respect the main upholstery 106 is substantially impermeable to air, so that it is also particularly suitable as ventilation means 111. With the softer air-permeable upholstery core 110 a rather varied hardness adjustment can be carried out on the upholstered part 104 depending upon how much air is supplied or extracted through the ventilation holes 112.

All the features disclosed in the application document are claimed as being essential to the invention, insofar as they are novel individually either or in combination novel over the prior art.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vehicle seat, comprising:
    a seat back; and
    at least one upholstered part, comprising:
    a main upholstery;
    an upholstery cover;
    a first barrier coat disposed between the main upholstery and the upholstery cover;
    an air-permeable upholstery core; and a means for ventilating the air-permeable upholstery core in a region adjoining the main upholstery,
    wherein the air-permeable upholstery core is spatially separated from the main upholstery by a layer of a second barrier coat.

2. The vehicle seat according to claim 1, wherein the upholstery cover further comprises a carrier layer; and
    the first barrier coat is disposed between the main upholstery and the carrier layer.

3. The vehicle seat according to claim 1, wherein the air-permeable upholstery core directly adjoins the upholstery cover.

4. The vehicle seat according to claim 3, wherein the upholstery cover further comprises a carrier layer; and
    the air-permeable upholstery core directly adjoins the carrier layer of the upholstery cover.

5. The vehicle seat accordingly to claim 1, wherein the layer of the second barrier coat is adhered to the first barrier coat in an adjacent edge region of the air-permeable upholstery core.

6. The vehicle seat according to claim 1, wherein the air-permeable upholstery core is formed of a more open-pored material body than the main upholstery.

7. The vehicle seat according to claim 1, wherein the ventilation means comprises at least one ventilation hole that extends below the air-permeable upholstery core through the main upholstery to the air-permeable upholstery core.

8. The vehicle seat accordingly to claim 1, wherein the ventilation means comprises at least one ventilation hole that extends below the air-permeable upholstery core through the main upholstery to the layer of the second barrier coat of the air-permeable upholstery core.

9. The vehicle seat according to claim 1, wherein the layer of the second barrier coat of the air-permeable upholstery core has a plurality of openings in the region of ventilation holes of the ventilation means.

10. The vehicle seat according to claim 1, wherein the upholstery cover further comprises a carrier layer; and the carrier layer of the upholstery cover comprises a cut foam material.

* * * * *